United States Patent [19]

Wefler

[11] Patent Number: 5,548,922
[45] Date of Patent: Aug. 27, 1996

[54] INSECT BAIT STATION

[75] Inventor: Mark E. Wefler, Mt. Pleasant, Wis.

[73] Assignee: S. C. Johnson & Son, Inc., Racine, Wis.

[21] Appl. No.: 371,239

[22] Filed: Jan. 11, 1995

[51] Int. Cl.$^6$ ............................................. A01M 1/20
[52] U.S. Cl. ................................. 43/131; 43/132.1
[58] Field of Search ..................... 43/131, 132.1, 43/121

[56] References Cited

U.S. PATENT DOCUMENTS

| | | | |
|---|---|---|---|
| D. 329,681 | 9/1992 | Demarest et al. | D22/122 |
| 884,928 | 4/1908 | Howard | 43/121 |
| 944,434 | 12/1909 | Heller | 43/131 |
| 1,519,456 | 12/1924 | Jones | 43/131 |
| 1,573,278 | 2/1926 | Schlesinger | 43/131 |
| 1,856,200 | 5/1932 | Tippey | 43/131 |
| 2,123,995 | 7/1938 | Harroun | 43/131 |
| 2,167,978 | 8/1939 | Jennerich | 43/121 |
| 4,263,740 | 4/1981 | Hemsarth et al. | 43/114 |
| 4,563,836 | 1/1986 | Woodruff et al. | 43/131 |
| 4,761,912 | 8/1988 | Dyer et al. | 43/131 |
| 4,793,093 | 12/1988 | Gentile | 43/132.1 |
| 5,033,229 | 7/1991 | Demarest et al. | 43/132.1 |
| 5,048,225 | 9/1991 | Brandli | 43/131 |
| 5,090,153 | 2/1992 | Mullen et al. | 43/121 |
| 5,121,881 | 6/1992 | Lembeck | 239/44 |
| 5,152,097 | 10/1992 | Rhodes | 43/132.1 |
| 5,231,792 | 8/1993 | Warner | 43/122 |

*Primary Examiner*—J. Elpel

[57] ABSTRACT

An insect bait station for offering a liquid insect bait to targeted insects and a method of offering liquid insect bait to targeted insects. The insect bait station includes a hollow body having a base and a cover joined in liquid-tight relation. The base has a floor and the cover has a stage positioned generally parallel to and above the floor of the base. The cover has an ascending ramp, that extends upwardly from the cover rim to a cover mount, and a descending ramp that extends downwardly from the cover mount to the stage. Interiorly facing surfaces of the floor and cover define a holding chamber wherein liquid insect bait may be confined. Spill-resistant access means provides a targeted insect located on the stage access to liquid insect bait confined within the holding chamber. Preferably, the spill-resistant access means includes a capillary liquid transport means for transporting the liquid insect bait upwardly from the floor of the base to a location where it is accessible to a targeted insect. The method includes the steps of providing an insect bait station made in accordance with the specification and placing it in a location frequented by the targeted insects.

19 Claims, 5 Drawing Sheets

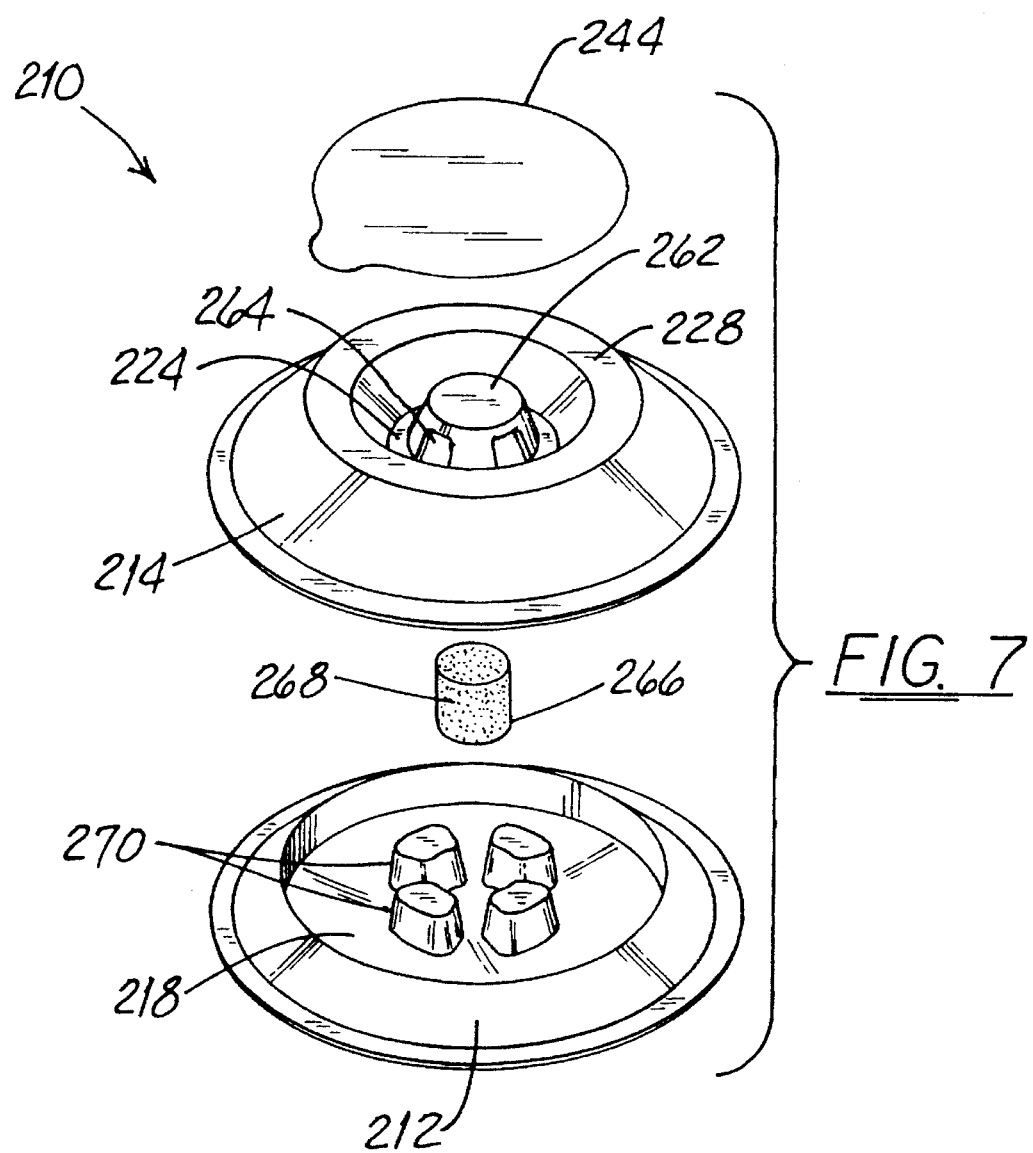
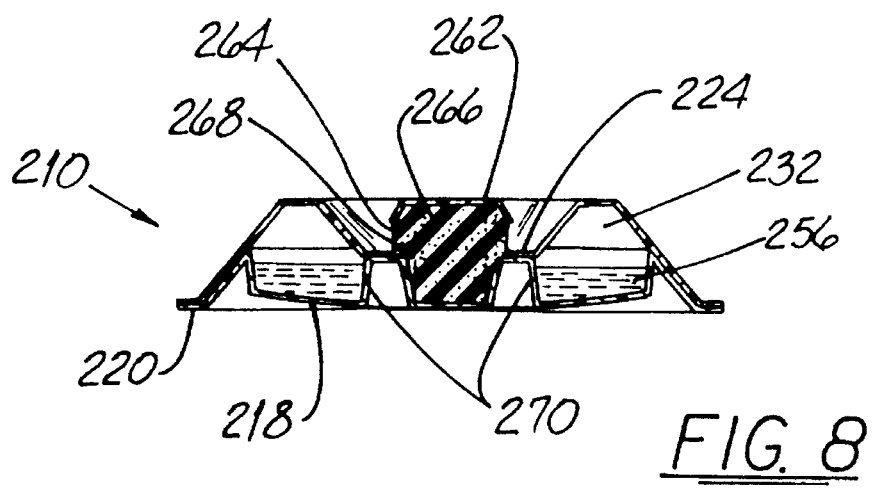

5,548,922

INSECT BAIT STATION

TECHNICAL FIELD

The present invention relates generally to the field of insect bait stations. More particularly, the invention relates to insect bait stations adapted to contain a liquid insect bait.

BACKGROUND ART

The art is generally aware of insect bait or feeding stations having a base joined to a cover that extends over the base to produce a hollow body. Woodruff et al., U.S. Pat. No. 4,563,836 and Brandli, U.S. Pat. No. 5,048,225 are examples of such insect feeding stations that are intended to contain a poisoned solid bait, with much of the structure of the insect feeding station intended to restrict access to the poisoned bait by a user, pet, or the like. Mullen et at., U.S. Pat. No. 5,090,153 is of similar structure but uses food or a pheromone to lure insects, which then are trapped in a sticky material applied to the central portion of the base.

Generally similar traps or feeding stations are disclosed in Rhodes, U.S. Pat. No. 5,152,097; Warner, U.S. Pat. No. 5,231,792; Tippey, U.S. Pat. No. 1,856,200; Gentile, U.S. Pat. No. 4,793,093; Harroun, U.S. Pat. No. 2,123,995; and Howard, U.S. Pat. No. 884,928.

A number of devices are known in the art that are specifically adapted to contain insect baits or poisons in liquid form. For example, Demarest et al., U.S. Pat. No. 5,033,229, provides an absorbent mat that serves as the floor of a circular structure. Insects gain access to the floor by crawling through ports located in the side of the structure. A reservoir above the circular mat is adapted to allow a liquid bait to seep down onto the mat and soak into it. Schlesinger, U.S. Pat. No. 1,573,278, includes a central well for holding a liquid insect poison and a hollow, cylindrical wick that lines and extends upwardly from the sides of the well to a cover. Liquid can soak through the wick to wet a fringe that surrounds the wick and is exposed to feeding ants. The wick is closed by the cover, which also extends over the rest of the bait station. The wick, together with the cover, is intended to prevent spillage of the liquid poison, should the device be turned on its side. The cover, together with a base, provides an enclosed feeding chamber surrounding the well and its cylindrical wick.

Lembeck, U.S. Pat. No. 5,121,881, is to an Air-Freshening Liquid Container and is not concerned with liquid insect bait or poison. However, Lembeck does show the use of open grooves formed in a plastic surface to carry liquid by capillary action upwardly from a reservoir to another, elevated location. In Lembeck, air freshening liquid is carried upwardly from a reservoir to an evaporator pad.

An ongoing need still exists in the art for an economical and easily manufactured insect bait station that can contain a liquid insect bait in such a way as to lessen the chance of spillage while, at the same time, providing for access to that bait by targeted insects. Liquid insect baits offer various advantages with respect to ants, wasps, and other insects thought to most easily assimilate food when it is in a liquid or liquifiable form.

SUMMARY OF THE INVENTION

The present invention is summarized in that an insect bait station for offering a liquid insect bait to targeted insects includes a hollow body having a base and a cover, the cover being joined to the base in liquid-tight relation. The base has a floor and a base rim at the periphery of the floor. The cover has a cover rim opposed to the base rim and a stage positioned generally parallel to and above the floor of the base. An ascending ramp is defined by inwardly inclined walls that extend upwardly from the cover rim to a cover mount. A descending ramp is defined by inwardly inclined walls extending downwardly from the cover mount to the stage. Interiorly facing surfaces of the floor and cover define a holding chamber wherein liquid insect bait may be confined. The invention further includes spill-resistant access means for providing a targeted insect located on the stage access to liquid insect bait confined within the holding chamber. Preferably, the spill-resistant access means includes a capillary liquid transport means for transporting the liquid insect bait upwardly from the floor of the base to a location where it is accessible to a targeted insect.

BRIEF DESCRIPTION OF THE DRAWINGS

FIG. 7 is an exploded view of a third embodiment of the insect bait station of the invention.

FIG. 8 is a cross-sectional view of the insect bait station of FIG. 7, now assembled and without the seal, the view of FIG. 8 corresponding to the view of FIG. 3.

DETAILED DESCRIPTION OF THE PREFERRED EMBODIMENT

Figure 1:
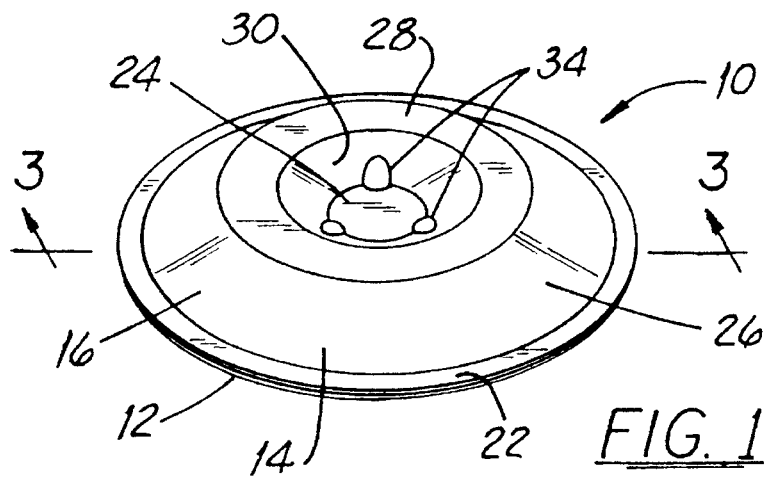
FIG. 1 is a front perspective view of the preferred embodiment of the insect bait station of the invention, with the seal removed.
Figure 2:
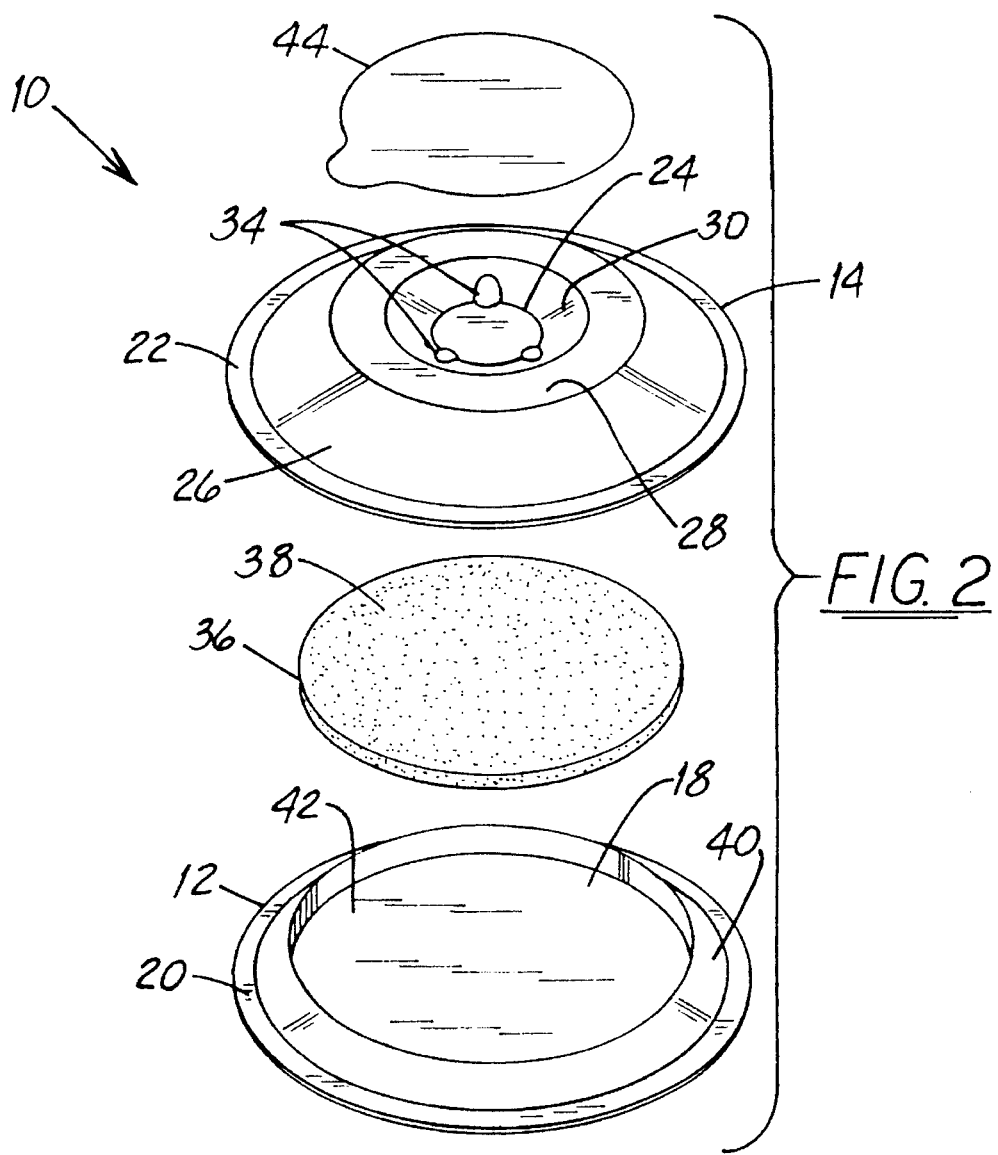
FIG. 2 is an exploded view of the insect bait station of FIG. 1, with the seal shown.

Turning now to the drawings, wherein like parts are indicated by like reference numbers, a first and preferred embodiment of the insect bait station of the invention is shown generally in FIG. 1 at 10. The bait station 10 has a base 12 and cover 14. The cover 14 is joined to the base 12 in liquid-tight relation to form a hollow body 16.

The base 12 has a floor 18 and a base rim 20, generally at the periphery of the floor. The cover 14 has a cover rim 22, opposed to the base rim 20 and joined thereto in liquid-tight relation. The cover 14 also has a stage 24, positioned generally parallel to and above the floor 18 of the base 12.

Figure 3:
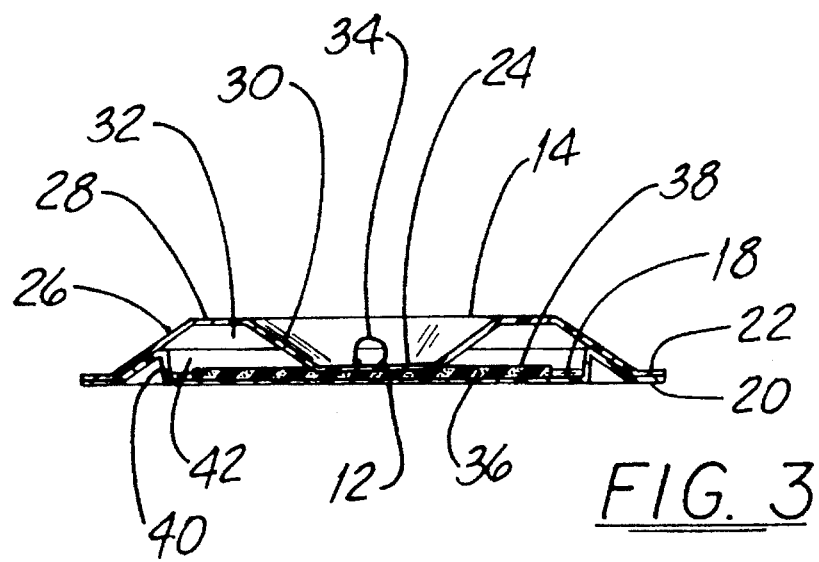
FIG. 3 is a cross-sectional view of the insect bait station of FIG. 1, taken along section lines 3—3 of FIG. 1.
Figure 4:
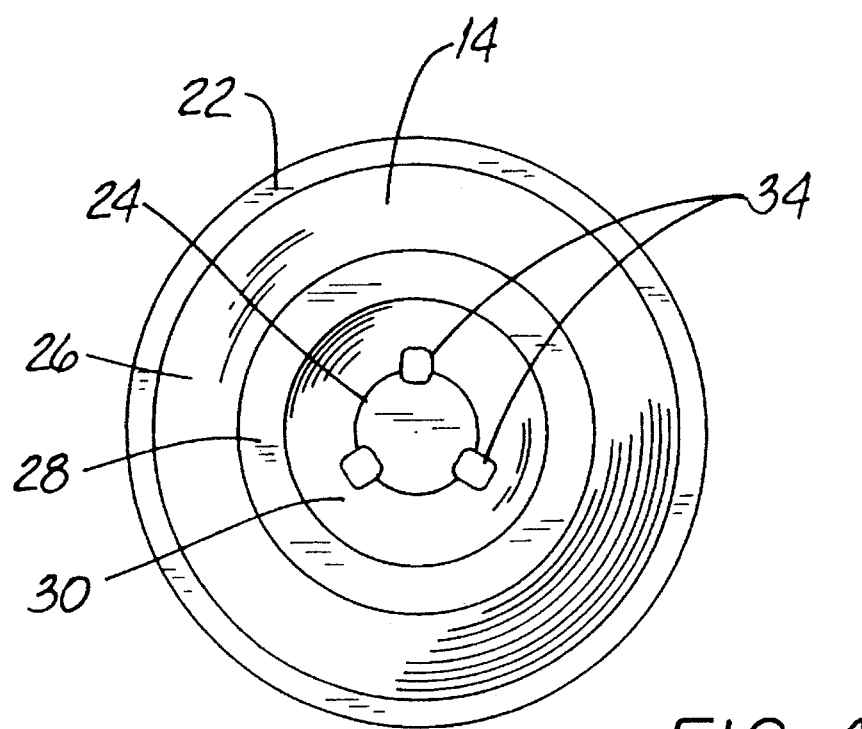
FIG. 4 is a top plan view of the insect bait station of FIG. 1.

The cover has an ascending ramp 26, defined by inwardly inclining walls extending upwardly from the cover rim 22 to a cover mount 28, and a descending ramp 30, defined by inwardly inclined walls extending downwardly from the cover mount 28 to the stage 24. As can be best seen in the cross-sectional view of FIG. 3, interiorly facing surfaces of the base 12 and cover 14 define a holding chamber 32, wherein liquid insect bait may be confined.

The insect bait station 10 of the invention also has spill-resistant access means for providing a targeted insect located on the stage 24 access to liquid insect bait confined within the holding chamber 32. Preferably, the spill-resistant access means includes capillary liquid transport means for transporting the liquid insect bait upwardly from the floor 18 of the base 12 to a location where it is accessible to a targeted insect.

In the preferred embodiment of the insect bait station of the invention shown at 10 in FIGS. 1–4, ramp portals 34 extend through the descending ramp 30 to communicate with the interior of holding chamber 32. The ramp portals 34 are of a size such that at least the feeding structures of the targeted insects may reach through the ramp portals and into the holding chamber 32. The ramp portals may also extend into the stage 24.

In the preferred embodiment of the invention shown at 10, the capillary liquid transport means includes a porous disk 36. The porous disk 36 has an upper surface 38, presented inwardly toward the interior of the holding chamber 32. The porous disk 36 rests upon and covers at least a portion of the floor 18 and is positioned so as to be in contact with any liquid insect bait that may be pooled on the floor. Such liquid bait is absorbed into the porous disk 36 to be transported upwardly from the floor 18 to the porous disk's upper surface 38 by capillary action. A targeted insect may then access and feed upon the liquid insect bait through the ramp portals 34.

Preferably, the ramp portals 34 are sufficiently large that the targeted insects may pass through the ramp portals and actually enter the holding chamber 32. Within the holding chamber 32, the insects may then walk upon and feed directly from the upper surface 38 of the porous disk 36. When a liquid insect bait used with the bait station 10 includes an insecticide, it is preferred that the insecticide be of a slow-kill nature of the sort well known in the art, so that the feeding insect may leave the insect bait station and return to its nest or hive to redistribute the poisoned bait among the insects congregated there and subsequently to die at a location remote from the insect bait station.

In the preferred embodiment shown in FIGS. 1–4, the porous disk 36 shown generally covers the entire floor 18 of the base 12, and the stage 24 is spaced somewhat above the floor 18, so that the porous disk may extend thereunder. It is desirable and preferred that the distance between the floor 18 and the underside of the stage 24 be small enough that the porous disk 36 is sufficiently confined therebetween to inhibit movement of the porous disk during shipping or handling of the insect bait station. However, it will be apparent to one skilled in the art that the stage 24 could be allowed to closely approach or even contact the floor 18. In such a design, the porous disk 36 could include a central opening (not shown) to accommodate the stage 24.

It is preferred that the base 12 include a substantially uninterrupted liquid dike 40 spaced inwardly from the base rim 20 and extending entirely around the floor 18. The floor 18 and liquid dike 40 define an upwardly open reservoir 42. The reservoir 42 is available to contain liquid insect bait placed therein during the manufacture of the insect bait station 10, prior to the assembly of the cover 14 to the base 12.

To facilitate transport and storage of the insect bait station when liquid insect bait is contained therein, a seal 44 preferably is removably affixed in liquid-tight relation to the cover mount 28. When in place on the cover mount 28, the seal 44 effectively closes off access to the stage 24, preventing evaporation and spillage of liquid insect bait and blocking insect access to the bait until a user removes the seal.

If the holding chamber 32 of the insect bait station of the invention as described is filled with freely flowing liquid insect bait in an amount insufficient to flow out of an opening placed no lower than the stage 24, the insect bait station may then be turned and rotated in any direction without substantial loss of liquid therefrom. As the insect bait station is turned about an axis parallel with the floor 18, the liquid insect bait will first flow into the then downwardmost pan of that portion of the holding chamber 32 that is defined by the floor 18 and the upwardly ascending ramp 26. Then, as the insect bait station is rotated further, until inverted, the liquid insect bait will flow into the then downwardmost portion of the holding chamber 32 defined by parts of the ascending ramp 26, the cover mount 28, and the parts of the descending ramp 30 between the cover mount and the first opening encountered in the descending ramp from the direction of the cover mount. Continued rotation will cause the liquid insect bait to flow into whatever corresponding portions of the holding chamber 32 are downwardmost at any given time.

Figure 5:
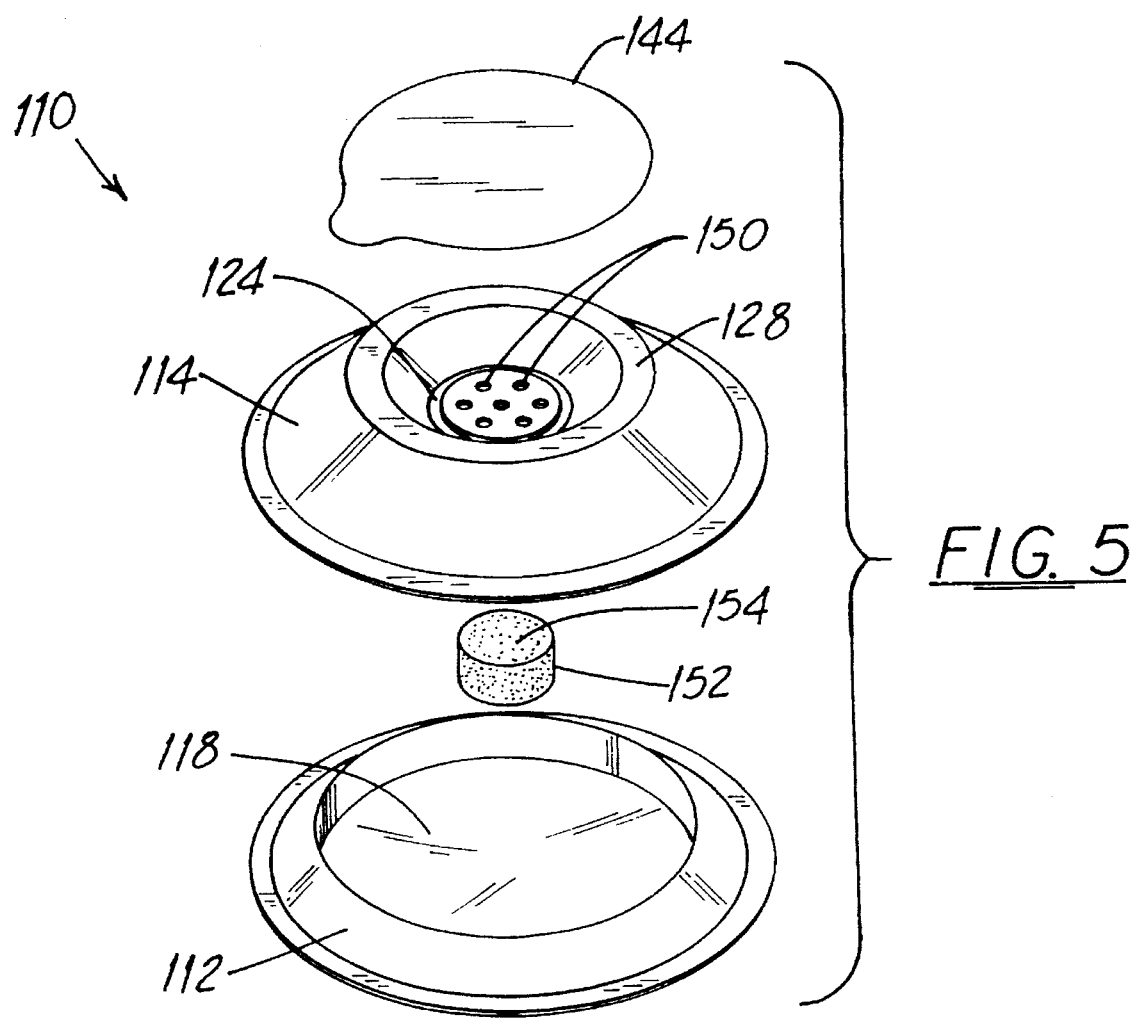
FIG. 5 is an exploded view of an alternative embodiment of the insect bait station of the invention.
Figure 6:
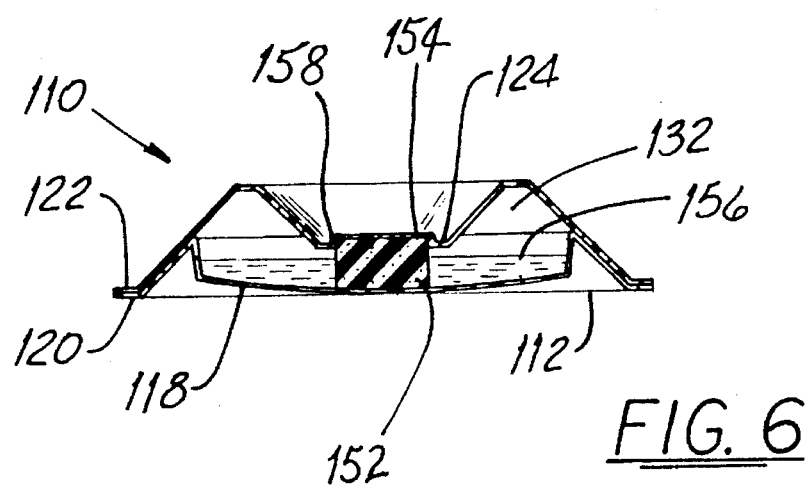
FIG. 6 is a cross-sectional view of the insect bait station of FIG. 5, now assembled and without the seal, the view of FIG. 6 corresponding to the view of FIG. 3.

Alternative embodiments of the insect bait station 10 of the invention will be apparent to one skilled in the art. A first such alternative embodiment is illustrated in FIGS. 5 and 6 at 110. Parts of the embodiment shown at 110 that correspond immediately to features and parts already described in the embodiment shown at 10 in FIGS. 1–4 will be shown without further description and given corresponding reference numbers beginning at 110, with "12" corresponding to "112," and so forth.

In the embodiment of the insect bait station that is shown at 110, the stage 124 includes stage feeding windows 150 through which at least the feeding structures of the targeted insects may reach. The stage feeding windows 150 provide access downwardly through the stage 124 to the interior of the holding chamber 132.

In the embodiment of the insect bait station shown at 110, the capillary liquid transport means includes a porous pad 152 having an upper surface 154. Porous pad 152 is interposed between the underside of the stage 124 and the floor 118. The porous pad 152 is held with sufficient force between the floor 118 and the stage 124 that its upper surface 154 substantially closes the stage feeding windows 150. By this means, liquid insect bait contained within the holding chamber 132, as is illustrated at 156 in FIG. 6, is substantially restrained from spilling out through the stage feeding windows 150.

The porous pad 152 is positioned so as to be in contact with any liquid insect bait 156 pooled on the floor 118. The liquid insect bait is transported through the porous pad by capillary action upwardly from the floor 118 to the upper surface 154 of the porous pad, where the liquid insect bait is accessible to a targeted insect feeding through the stage feeding windows 150.

Preferably a portion of the stage 124 is upwardly elevated to define a downwardly open retention socket 158, best seen in FIG. 6. The retention socket 158 has a size and shape such that it may receive the upper-most portion of the porous pad 152, which fits and is held within the retention socket to retain the porous pad in position beneath the stage 124.

Preferably, surfaces of the floor 118 of the base 112 descend downwardly from a location remote from the porous pad 152 to a location immediate to and preferably beneath the porous pad 152. By this means, even minimal amounts of liquid insect bait 156 pooled upon the floor 118 will drain toward the porous pad 158 and be sufficient to contact the porous pad for transport upwardly toward the upper surface 154 thereof.

A third embodiment of the insect bait station of the invention is shown in FIGS. 7 and 8 at 210. As with the previous embodiment, parts corresponding to those discussed with respect to the embodiments at 10 and 110 will be given corresponding reference numbers, starting at 210.

In the embodiment of the insect bait station shown generally at 210, the stage 224 includes a hollow pillar 262 rising upwardly from the stage. The sides of the pillar have pillar feeding windows 264, through which at least the feeding structures of the targeted insects may reach. The pillar feeding windows 264 provide access through the sides of the pillar 262 to the interior of the holding chamber 232.

A porous wick 266 having sides 268 is positioned within the pillar 262. The wick 266 substantially fills the pillar 262 so that the sides 268 of the wick substantially close the pillar feeding windows 264. By this means, liquid insect bait contained within the holding chamber 232 is restrained from flowing out through the pillar feeding windows 264. Such liquid insect bait is illustrated in FIG. 8 at 256. The wick 266 so positioned transports liquid insect bait upwardly by capillary action from the floor 218 to the pillar feeding windows 264, where the liquid insect bait is accessible to a targeted insect feeding through the pillar feeding windows. This arrangement is thus another embodiment of a capillary liquid transport means.

Preferably the insect bait station 210 includes at least two wick positioning braces 270 spaced from each other and extending upwardly from the floor 218 beneath the location of the pillar 262. The wick positioning braces 270 are so separated from each other as to avoid isolating the portion of the floor 218 located between them, so that liquid insect bait pooled upon the floor may freely flow between and around the wick positioning braces. The wick positioning braces 270 are adapted to retain the wick 266 between them during the manufacture and use of the insect bait station 210 to position the wick beneath the hollow pillar 262.

In a manner corresponding to that of the embodiment discussed above and shown at 110 in FIG. 6, surfaces of the floor 218 descend downwardly from a location remote from the wick 266 to a location immediate to and preferably beneath the wick. By this means, it is insured that even minimal amounts of liquid insect bait 256 contained on the floor 218 will drain toward and come in contact with the wick 266 to be carried upwardly thereby to the pillar feeding windows 264.

Figure 9:
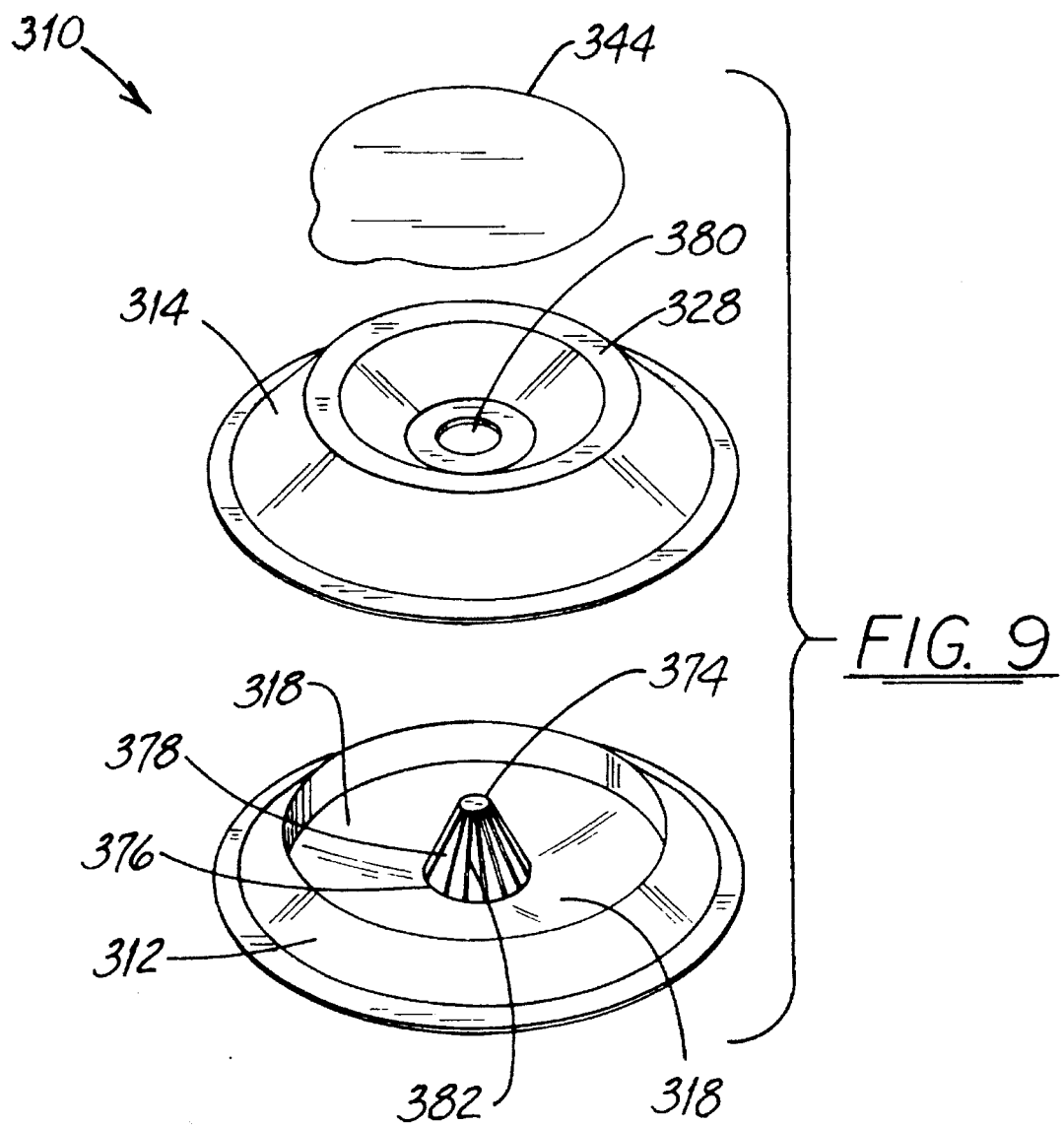
FIG. 9 is an exploded view of a fourth embodiment of the liquid bait station of the invention.
Figure 10:
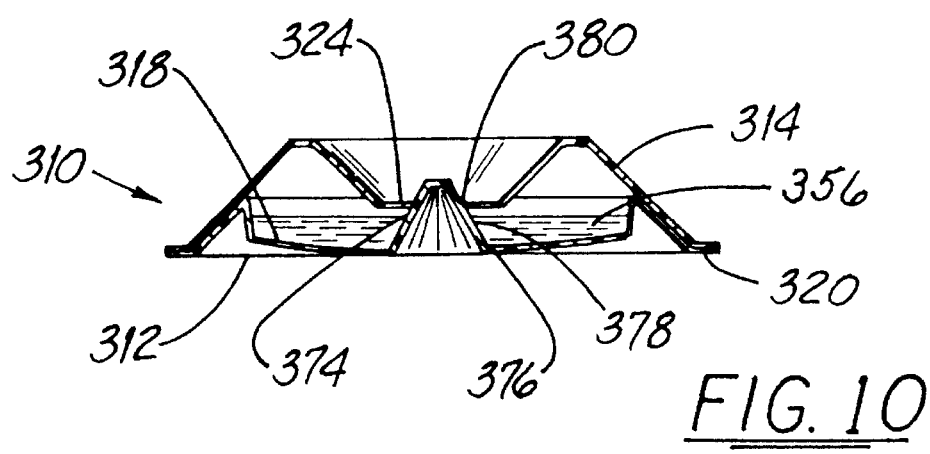
FIG. 10 is a cross-sectional view of the insect bait station of FIG. 9, now assembled and without a seal, the view of FIG. 10 corresponding to the view of FIG. 3.

A fourth embodiment of the insect bait station of the invention is shown generally at 310 in FIGS. 9 and 10. As with the preceding alternative embodiments, parts corresponding to those discussed above will be given corresponding reference numbers beginning with 310.

The embodiment of the insect bait station shown at 310 includes a non-porous feeding structure 374, which has a lower end 376 and sides 378 extending upwardly from the lower end. The feeding structure 374 extends upwardly from the floor 318 and may be unitarily formed therewith.

The stage 324 includes a feeding structure opening 380 through which the feeding structure 374 extends in closely fitting, substantially liquid-tight relation. The embodiment of the insect bait station shown at 310 includes capillary liquid transfer means including open capillary grooves 382 formed on the sides 378 of the feeding structure 374. The capillary grooves 382 extend upwardly from the point at which the feeding structure's lower end 376 most closely approaches the floor 318, to a location above the stage 324. By this arrangement, the lower ends of the capillary grooves 382 are positioned to contact any liquid insect bait 356 pooled on the floor 318, to transport the liquid insect bait upwardly in the capillary grooves to a location above the stage 324, where targeted insects may have direct access to the liquid insect bait, feeding from the capillary grooves.

In a manner corresponding to the embodiment described above at 110, surfaces of the floor 318 of the insect bait station 310 preferably descend downwardly from a location remote from the feeding structure 374 to a location immediate to and preferably in contact with the lower end 376 of the feeding structure to insure that even minimal amounts of liquid insect bait 356 pooled upon the floor 318 drain toward the feeding structure to contact it.

The method of the invention for offering a liquid insect bait to targeted insects includes the step of providing an insect bait station made in accord with the above description of the insect bait station of the invention and including within the holding chamber thereof a selected liquid insect bait. The insect bait station so provided is then placed in a location frequented by the targeted insects. Each of the embodiments of the insect bait station, described above, is suitable for practice of the method of the invention.

The cover and base of all of the embodiments disclosed above of the insect bait station of the invention, together with the feeding structure of the last embodiment disclosed, may be molded or otherwise formed from conventional plastics by conventional means well known to those skilled in the art. The cover and base may be made separately and then joined in liquid-tight relation, either before or after the addition of a liquid insect bait, by ultrasonic welding, spin welding, heat sealing, producing a seal by a snap-on fit, or similar, conventional techniques for fabricating plastic objects. The porous structures described above may be made of any otherwise suitable porous woven or non-woven material, porous solids, sponges, and the like. The insect bait stations shown in the drawings at 10, 110, 210, and 310 all are round, but the invention should not be deemed limited to that shape. Insect bait stations of the invention may be any convenient shape.

Industrial Applicability

The invention has practical industrial application in the presentation of liquid insect bait to attract insects, which may be done for any of a number of monitoring or control purposes. When control is desired, the liquid insect bait would include an appropriate insecticide. The insect bait station of the invention is useful with crawling insects, such as ants, roaches, earwigs, silverfish, and the like, and would also be useful with flying insects, such as wasps and bees.

While preferred forms of the invention have been shown in the drawings and have been described above, variations will be apparent to those skilled in the art, and the usefulness of the bait station with respect to other insects will also be readily apparent to those skilled in the art. Consequently, the invention should not be construed as limited to the specific forms shown and described. Instead, the invention should be understood in terms of the following claims.

I claim:

1. An insect bait station for offering a liquid insect bait to targeted insects comprising a hollow body having a base and a cover, the cover joined to the base in substantially liquid-tight relation, a. the base having a floor and a base rim at the periphery of the floor;

b. the cover having a cover rim opposed to the base rim, a stage positioned generally parallel to and above the floor, an ascending ramp defined by inwardly inclined walls extending upwardly from the cover rim to a cover mount, and a descending ramp defined by inwardly inclined walls extending downwardly from the cover mount to the stage, interiorly facing surfaces of the floor and the cover defining a holding chamber wherein liquid insect bait may be confined; and c. spill resistant access means for providing a targeted insect located on the stage access to liquid insect bait confined within the holding chamber, the spill resistant access means including capillary liquid transport means for transporting the liquid insect bait upwardly from the floor to a location where it is accessible to a targeted insect.

2. The insect bait station of claim 1 wherein a. the stage includes at least one stage feeding window through which at least the feeding structures of the targeted insects may reach, the stage feeding window providing access downwardly through the stage to the interior of the holding chamber, and b. the capillary liquid transport means includes a porous pad interposed between the underside of the stage and the floor, the porous pad being held against the underside of the stage with sufficient force that the stage feeding window is substantially closed by the porous pad, and liquid insect bait contained within the holding chamber is restrained from flowing out through the stage feeding window, the porous pad being positioned so as to be in contact with liquid insect bait contained on the floor, to transport the liquid insect bait by capillary action upwardly from the floor to the upper surface of the porous pad, where the liquid insect bait is accessible to a targeted insect feeding through a stage feeding window.

3. The insect bait station of claim 2 wherein a central portion of the stage is upwardly elevated to define a downwardly open retention socket, and the uppermost portion of the porous pad fits and is held within the retention socket to retain the porous pad in position beneath the stage.

4. The insect bait station of claim 3 wherein surfaces of the floor descend downwardly from a location remote from the porous pad to a location immediate to the porous pad to ensure that even minimal amounts of liquid insect bait pooled upon the floor are sufficient to contact the porous pad.

5. The insect bait station of claim 1 wherein the descending ramp includes ramp portals through which at least the feeding structures of the targeted insects may reach, and the capillary liquid transport means includes a porous disk covering at least a portion of the floor and having an upper surface, the porous disk being positioned so as to be in contact with liquid insect bait contained on the floor to transport the liquid insect bait upwardly by capillary action from the floor to the upper surface of the porous disk, where the liquid insect bait is accessible to a targeted insect through the ramp portals.

6. The insect bait station of claim 5 for use with selected targeted insects wherein the ramp portals are sufficiently large that the targeted insects may pass therethrough and enter the holding chamber to walk upon and feed from the upper surface of the porous disk.

7. The insect bait station of claim 5 wherein the porous disk extends under the stage and the underside of the stage is spaced above the floor closely enough to inhibit movement of the porous disk during shipping or handling of the insect bait station.

8. The insect bait station of claim 1 wherein a. the stage includes a hollow pillar rising upwardly from the stage, the sides of the pillar having pillar feeding windows through which at least the feeding structures of the targeted insects may reach, the pillar feeding windows providing access through the sides of the pillar to the interior of the holding chamber, and b. a porous wick is positioned within the pillar, the wick substantially filling the pillar to close the pillar feeding windows and restrain liquid insect bait contained within the holding chamber from flowing out through the pillar feeding windows, the wick extending downwardly to the floor and being positioned so as to be in contact with liquid insect bait contained on the floor, to transport the liquid insect bait upwardly by capillary action from the floor to the pillar feeding windows, where the liquid insect bait is accessible to a targeted insect feeding through the pillar feeding windows.

9. The insect bait station of claim 8 wherein the floor includes at least two wick positioning braces spaced from each other and extending upwardly from the floor beneath the location of the pillar without isolating the portion of the floor between the wick positioning braces from the remainder of the floor, the wick positioning braces being adapted to retain the wick between them during the manufacture of the insect bait station prior to the assembly of the cover to the base, positioning the wick beneath the hollow pillar.

10. The insect bait station of claim 8 wherein surfaces of the floor descend downwardly from a location remote from the wick to the portion of the floor immediate to the wick to ensure that even minimal amounts of liquid insect bait pooled upon the floor are sufficient to contact the wick.

11. The insect bait station of claim 1 a. including a non-porous feeding structure having a lower end and sides, the feeding structure extending upwardly from the floor; and b. wherein the stage includes a feeding structure opening through which the feeding structure extends in closely fitting, substantially liquid-tight relation; and c. the capillary liquid transfer means includes open capillary grooves formed on the sides of the feeding structure and extending upwardly from the floor to a location above the stage, the lower ends of the capillary grooves being positioned to contact any liquid insect bait contained in the holding chamber to transport the liquid insect bait upwardly in the capillary grooves to a location above the stage where targeted insects may have direct access to the liquid insect bait from the capillary grooves.

12. The insect bait station of claim 11 wherein surfaces of the floor descend downwardly from a location remote from the feeding structure to the portion of the floor immediate to the feeding structure to ensure that even minimal amounts of liquid insect bait pooled upon the floor are sufficient to contact the feeding structure.

13. The insect bait station of claim 1 wherein the base includes a substantially uninterrupted liquid dike spaced inwardly from the base rim, the floor and liquid dike defining an upwardly open reservoir to contain liquid insect bait placed therein prior to the assembly of the cover to the base during the manufacture of the insect bait station.

14. The insect bait station of claim 1 including a seal removably affixed in liquid-tight relation to the cover mount to seal all means of access to or loss of any liquid insect bait contained within the insect bait station.

15. A method of offering a liquid insect bait to targeted insects comprising the steps of a. providing an insect bait station having a hollow body having a base and a cover joined in substantially liquid-tight relation, the base having a floor and a base rim at the periphery of the floor; and the cover having a cover rim opposed to the base rim, a stage positioned generally parallel to and above the floor, an ascending ramp defined by inwardly inclined walls extending upwardly from the cover rim to a cover mount, and a descending ramp defined by inwardly inclined walls extending downwardly from the cover mount to the stage, interiorly facing surfaces of the floor and the cover defining a holding chamber wherein liquid insect bait is confined; and spill resistant access means for providing a targeted insect located on the stage access to the liquid insect bait confined within the holding chamber, the spill resistant access means including capillary liquid transport means for transporting the liquid insect bait upwardly from the floor to a location where it is accessible to a targeted insect; and b. placing the insect bait station in a location frequented by the targeted insects.

16. The method of claim 15 wherein a. the stage includes at least one stage feeding window through which at least the feeding structures of the targeted insects may reach, the stage feeding window providing access downwardly through the stage to the interior of the holding chamber, and b. the capillary liquid transport means includes a porous pad interposed between the underside of the stage and the floor, the porous pad being held against the underside of the stage with sufficient force that the stage feeding window is substantially closed by the porous pad, and liquid insect bait contained within the holding chamber is restrained from flowing out through the stage feeding window, the porous pad being positioned so as to be in contact with the liquid insect bait contained on the floor, to transport the liquid insect bait by capillary action upwardly from the floor to the upper surface of the porous pad, where the liquid insect bait is accessible to a targeted insect feeding through a stage feeding window.

17. The method of claim 15 wherein the descending ramp includes ramp portals through which at least the feeding structures of the targeted insects may reach, and the capillary liquid transport means includes a porous disk covering at least a portion of the floor and having an upper surface, the porous disk being positioned so as to be in contact with the liquid insect bait contained on the floor to transport the liquid insect bait upwardly by capillary action from the floor to the upper surface of the porous disk, where the liquid insect bait is accessible to a targeted insect through the ramp portals.

18. The method of claim 17 for use with selected targeted insects wherein the ramp portals are sufficiently large that the targeted insects may pass therethrough and enter the holding chamber to walk upon and feed from the upper surface of the porous disk.

19. The method of claim 17 wherein the porous disk extends under the stage and the underside of the stage is spaced above the floor closely enough to inhibit movement of the porous disk during shipping or handling of the insect bait station.

* * * * *